United States Patent [19]

Hart

[11] 4,099,088
[45] Jul. 4, 1978

[54] DISPLAY SYSTEM WITH RAPID COLOR SWITCHING

[75] Inventor: Harold M. Hart, Wellesley, Mass.

[73] Assignee: Raytheon Company, Lexington, Mass.

[21] Appl. No.: 809,967

[22] Filed: Jun. 27, 1977

Related U.S. Application Data

[60] Continuation-in-part of Ser. No. 721,252, Sep. 8, 1976, abandoned, which is a continuation of Ser. No. 601,852, Aug. 4, 1975, abandoned, which is a continuation of Ser. No. 485,415, Jul. 3, 1974, abandoned, which is a division of Ser. No. 319,968, Dec. 29, 1972, Pat. No. 3,840,773.

[51] Int. Cl.² .................. H01J 29/46; H01J 29/26; H01J 31/20
[52] U.S. Cl. .................................. 313/450; 313/473
[58] Field of Search ............. 313/449, 450, 461, 473, 313/415, 398

[56] References Cited

U.S. PATENT DOCUMENTS

| | | | |
|---|---|---|---|
| 2,580,073 | 12/1951 | Burton | 313/473 |
| 2,916,664 | 12/1959 | Sternglass | 313/450 |
| 3,143,681 | 8/1964 | Schlesinger | 313/450 |
| 3,517,243 | 6/1970 | Jones | 313/473 |
| 3,522,463 | 8/1970 | Bishop | 313/473 |
| 3,560,636 | 2/1971 | Barlow | 313/473 X |
| 3,714,490 | 1/1973 | Kell | 313/473 |
| 3,721,849 | 3/1973 | Gallaro | 313/473 |

Primary Examiner—Robert Segal
Attorney, Agent, or Firm—J. R. Inge; M. D. Bartlett; J. D. Pannone

[57] ABSTRACT

An improved color display system employing a beam penetration type cathode-ray tube with rapid color switching. The screen electrode is separated from the accelerating electrodes without the use of an isolating mesh so that the voltage applied to the screen electrode is switched across only a relatively small capacitance. The invention may be used in conjunction with either magnetic or electrostatic deflection beam penetration cathode-ray tubes as well as either magnetic or electrostatic focus tubes. Such display systems may be used for radar type random access or scanned raster type displays.

6 Claims, 5 Drawing Figures

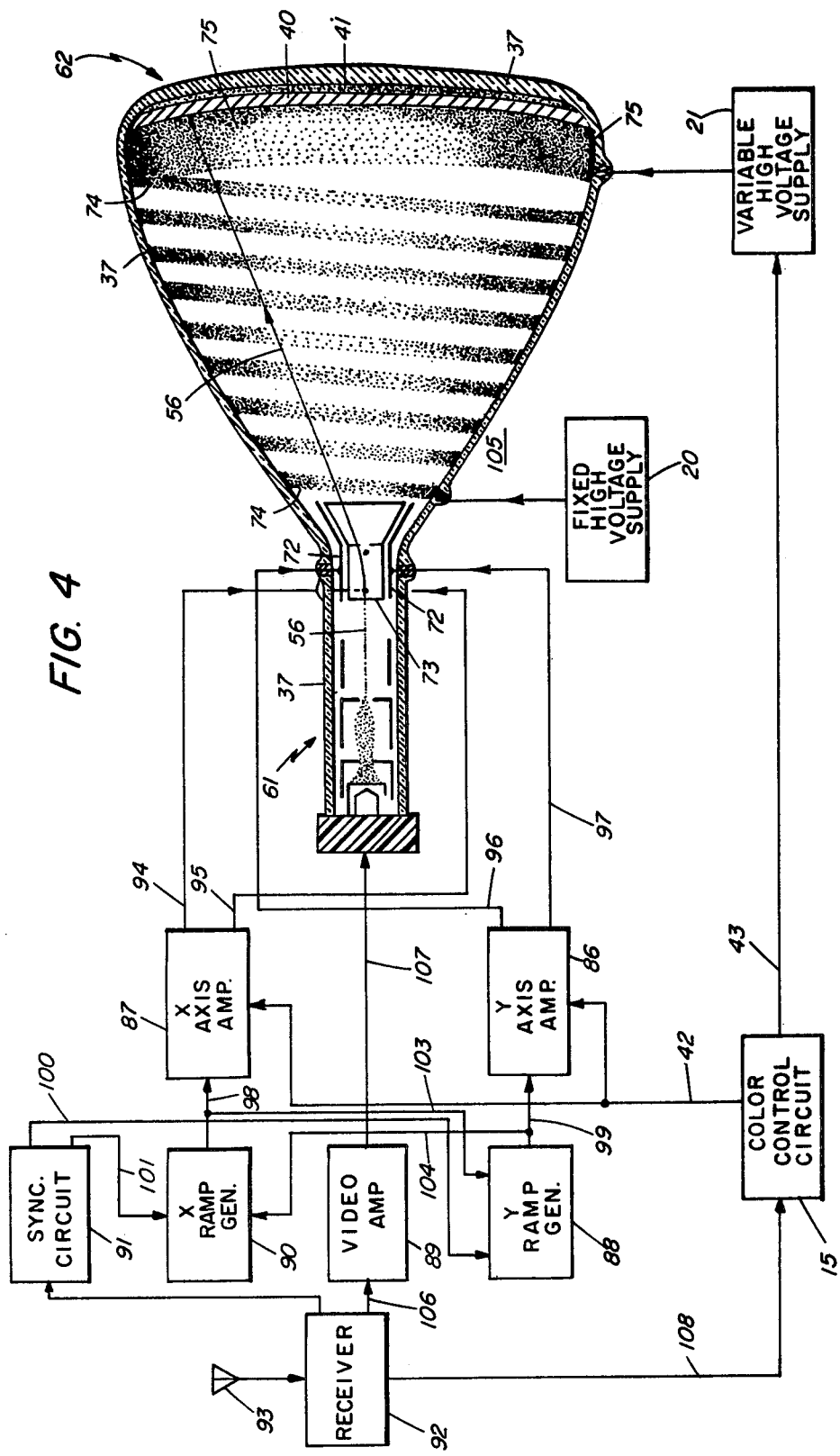

DISPLAY SYSTEM WITH RAPID COLOR SWITCHING

CROSS-REFERENCE TO RELATED CASES

This is a continuation-in-part of application Ser. No. 721,252 filed Sept. 8, 1976, now abandoned, which is a continuation of application Ser. No. 601,852 filed Aug. 4, 1975, now abandoned, which is a continuation of application Ser. No. 485,415 filed July 3, 1974, now abandoned, which is a division of Ser. No. 319,968 filed Dec. 29, 1972, now U.S. Pat. No. 3,840,773.

BACKGROUND OF THE INVENTION

Numerous prior art attempts have been made to construct multiple color cathode-ray tube systems in which the color is varied by changing the screen anode voltage and hence the beam velocity and the penetration depth of the electron beam into a multilayer phosphor screen. The earliest of these attempts included a cathode-ray tube wherein the screen electrode and conductive coating on the inside of the tube envelope formed a single electrode both connected to the same high voltage source. These early attempts suffered from two major problems. First, the screen electrode and conductive coating connected together formed a large capacitance across which the high voltage had to be switched each time the color was to be changed. This large capacitance created the need for a high powered amplifier which was capable of switching the voltage across such a capacitance in a relatively short period of time, otherwise large delay times had to be tolerated if a more reasonably powered amplifier switch was used to the high voltage. Secondly, whenever the high voltage to the screen and conductive coating was switched, the deflection sensitivity of the tube also changed since the high voltage which was connected to these electrodes was the final accelerating voltage which is determinative of the deflection sensitivity of the tube.

Later attempts divided the screen electrode from the conductive coating on the inside of the tube envelope with a conductive wire mesh inserted between the two electrodes thus formed. Although the capacitance of the screen electrode, with respect to the tube cathode and ground, was reduced somewhat by the separation, the insertion of the mesh raised the capacitance again to a higher capacitance since the mesh and screen electrodes formed a parallel plate capacitor. Furthermore, such a mesh created problems when the electron beam struck the wire of the mesh.

One attempt to circumvent the problem of having to switch a high voltage across a large capacitance included a tube in which the screen electrode and envelope coating electrode were connected together but two or more separate electron guns were used, one for each of the layers of phosphor in the screen. Each of these electron guns was connected to a different voltage so that the voltage between each gun and the screen was different. One problem with such multiple gun beam penetration cathode-ray tubes was arcing between the guns as several kilovolts of voltage difference were typically required between the electron guns to achieve usable penetration depth difference. Furthermore, the potential difference between the electron guns created lensing effect in the gun region which resulted in pattern distortion problems. Also, it was necessary to impress the video signals upon a relatively high voltage compared with their normal voltage levels.

SUMMARY OF THE INVENTION

These, as well as other objects of the invention, may be met by a cathode-ray tube having an envelope with neck, accelerating and screen portions and an electron gun located in the neck portion for producing a beam of electrons which is directed toward the screen portion. Disposed on the screen portion is a phosphor screen layer with the phosphors being such that the color of light emitted is dependent upon the velocity of the electrons in the electron beam where they strike the screen layer. The phosphor screen layer may have a plurality of concentric layers of phosphors, may have an inert layer around the phosphor particles of at least one type, may have the various phosphor particle types arranged in layers, or may have phosphors of differing persistence.

There are further provided a conductive layer contiguous to the phosphor screen layer and a first accelerating electrode disposed on a first section of the accelerating portion of the envelope adjacent the neck portion and outside the path traversed by the electron beam. A second accelerating electrode is also provided disposed upon a second portion of the accelerating portion of the envelope adjacent the screen portion and electrically coupled to the conductive layer. A gap exists between the first and second accelerating electrodes. In one embodiment, the width of the gap is less than the distance from the electron beam at the closest approach of the electron beam to the gap. The nearest approach is ordinarily at the deflection of the electron beam at the farthest periphery of the screen used for display of data. In another embodiment, the distance between the gap and the electron beam at the closest approach of the electron beam to the gap is made sufficiently great that substantially no pattern distortion is effected upon changing the voltage applied to the second accelerating electrode.

BRIEF DESCRIPTION OF THE DRAWINGS

The aforementioned objects and other features of the invention are explained in the following description taken in connection with the accompanying drawings wherein:

FIG. 4 is a cross-sectional view of an alternate type of cathode-ray tube used in a scanned raster display system in accordance with the present invention.

DESCRIPTION OF THE PREFERRED EMBODIMENT

Figure 1:
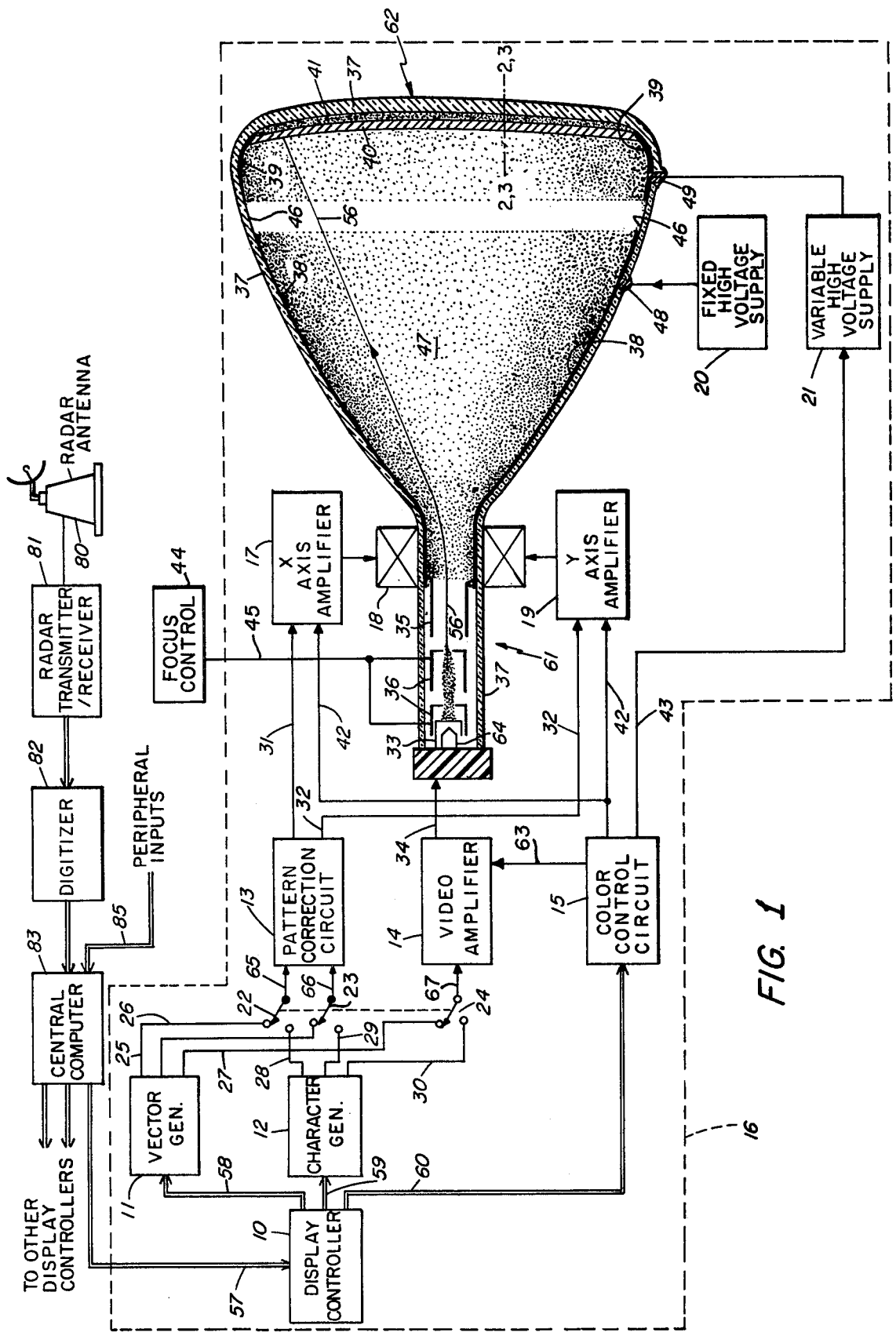
FIG. 1 is a cross-sectional view of a first type of cathode-ray tube used in a radar data display system in accordance with the present invention.

In FIG. 1 a cathode-ray tube, shown generally at 47, is used in a display system in accordance with the present invention. In this tube 47, the electron gun 61 is a standard electron gun as is used in a monochrome cathode-ray tube. The electron gun 61 produces a single electron beam rather than a plurality of electron beams as used in some multiple color cathode-ray tubes. In this electron gun, the cathode 33, heated by filament 64, emits electrons which are focussed into a beam by focussing electrodes 36 and accelerated toward the screen by the first accelerating electrode 35. The first accelerating electrode 35 is coupled to fixed high voltage supply 20 through conductive coating 38. The magnetic deflection yoke 18 deflects the beam to the desired position on the screen 62 as in most cathode-ray tube systems. In the particular embodiment of the invention shown in FIG. 1, the conductive coating 38 on the inside of the glass tube envelope 37 extends from the electron gun region toward the front of the tube and completely covers the inside of the tube envelope 37 in the region between the electron gun 61 and gap 46 thereby forming a second accelerating electrode at the same voltage as the first accelerating electrode 35 as the two are electrically connected.

Figure 5:
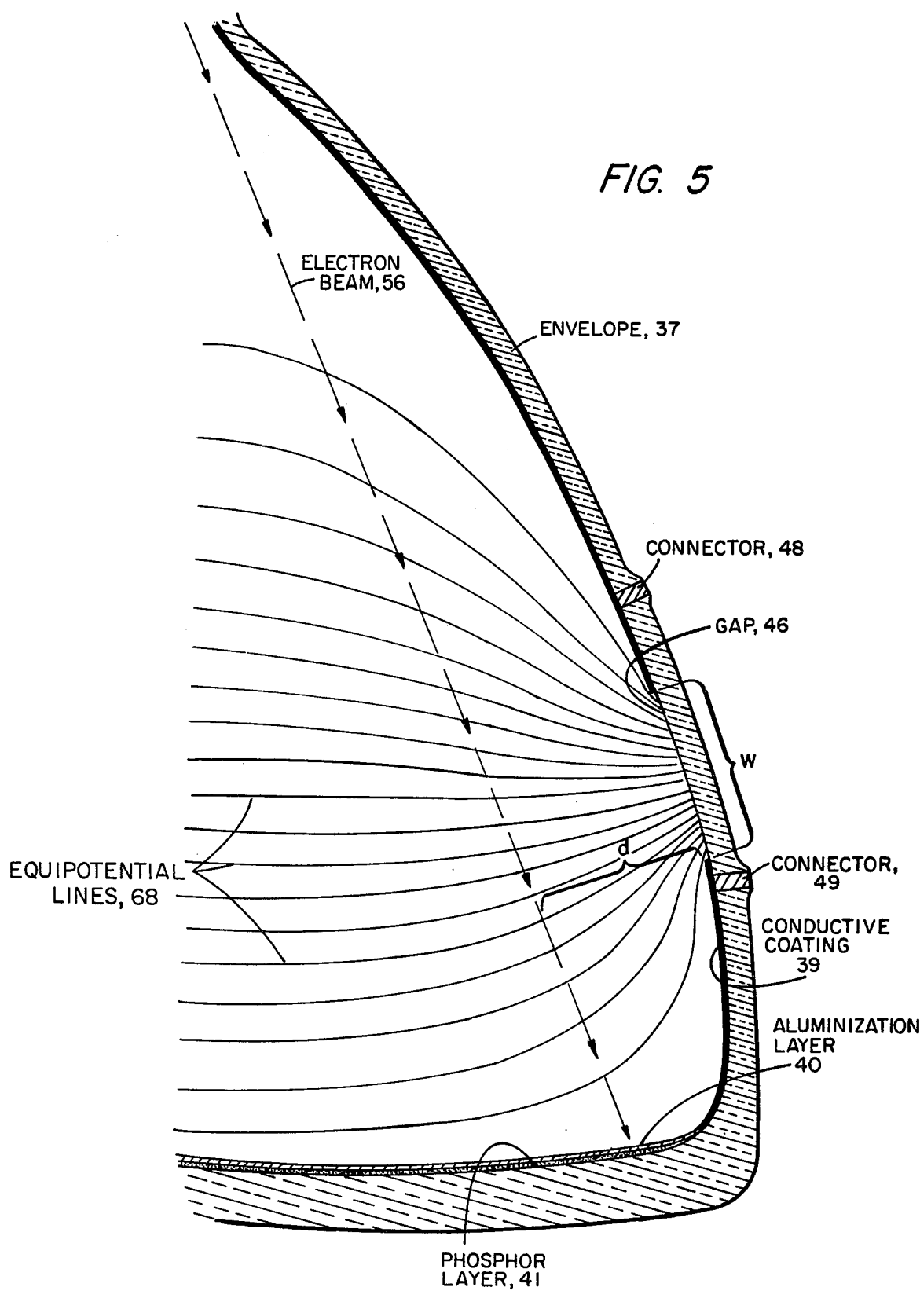
FIG. 5 is a partial cross-sectional view of a cathode-ray tube of FIG. 1 showing details of the construction and operation of the tube.

A nonconductive gap 46 separates conductive coating 38 from second conductive coating 39. Conductive coating 39 is connected to aluminization layer 40 which forms the screen electrode. Second conductive coating 39 extends from aluminization layer 40 to one side of the gap 46. The width and position of gap 46 are chosen along with the distance between electron beam 56 and gap 46 at the closest approach of electron beam 56 to gap 46 to have dimensions which will minimize the electrostatic field concentrations and hence lensing effects within the region near the screen 41 of the tube as the proper dimensions will greatly reduce the strength of the electrostatic lens formed by the voltage difference between the first conductive coating 38 and second conductive coating 39. This effect will be explained in greater detail with reference to the view of FIG. 5. Equipotential lines 68 have been constructed for the particular tube geometry shown. These lines are an indication of the electrostatic lens formed when two different potentials are applied to connectors 48 and 49. As is well known, the greater the angle between an equipotential line and an electron beam at their intersection the less will be the lateral force on the electrons of the beam at that point. For a ninety-degree angle of intersection, there is no lateral force, while for a zero-degree angle the force is a maximum. Hence, it is desirable to construct the tube such that the angle of intersection between the electron beam and lines of equipotential is as near to ninety-degrees as possible over as large an area of beam sweep as practical. If the effects of the electrostatic lens are not minimized, a distortion in the displayed pattern will result in the form of a "barreling" effect. A correction to the deflection waveforms can be applied in a similar manner to that for the otherwise required "pincushion" correction. However, as the lens effect is nonlinear with respect to the difference between the anode potentials, a different nonlinear correction would have to be applied to the deflection waveforms for each color desired to be displayed. Such corrections would be inordinately expensive and cumbersome to implement.

It has been discovered that if the distance $d$ of closest approach between electron beam 56 and gap 46 is greater than or equal to $w$ the width of gap 46, the lens effect pattern distortion will be reduced to a sufficiently low level that no nonlinear corrections need be applied. Thus, when switching between colors by changing the screen electrode voltage, only the absolute gain of each deflection amplifier need be changed to correct for the change in deflection factor caused by the change in final accelerating electrode voltage. No inter-axis nonlinear correction need be made.

In other embodiments of the invention there are a plurality of gaps such as gap 46 to further reduce the strength of the electrostatic lenses and hence further reduce positional distortion caused by such electrostatic lenses. In some of these embodiments, with multiple gaps and hence multiple accelerating electrodes, the electrodes may each be set at a different voltage. In still further embodiments of the present invention, the conductive coating on the inside of the tube envelope may be fashioned in the form of a spiral or helix with the end nearest the electron gun at one voltage and the end nearest the screen electrode at a second voltage. In such cases, the screen electrode may be connected to one end of the helix or it may be connected to a separate high voltage supply. Such a system will be discussed later in conjunction with FIG. 4.

In any of the embodiments of the present invention, there need be no conductive mesh between the screen electrode and the electrode or electrodes formed on the inner surface of the tube envelope. Thus, only a comparatively small capacitance need be switched, i.e., the capacitance formed by the screen electrode 40 and the reference ground of the screen electrode's high voltage power supply which is most commonly the system ground. In most applications, this capacitance tends to be minimal in that the screen must be exposed for viewing and hence is not usually near or parallel to any large metallic or conductive surfaces with which relatively large capacitances may be formed. In contrast, the capacitances formed from the electrodes on the conductive surface of the tube envelope which, in many applications are either surrounded by a grounded metallic shield or are near a grounded conductive chassis or other such components within the console in which it is customarily mounted, are much higher. Hence, if an attempt were made to switch these electrodes, the capacitance across which the high voltage must be switched is correspondingly higher. With the capacitance reduced across which the high voltage which must be switched in order to change colors the switching time between colors is reduced making the cathode-ray tube useful in many applications in which it formerly could not be used because of the long switching times or high amplifier power required.

Again, referring to the embodiment shown in FIG. 1, a fixed high voltage supply 20 is connected through a metallic connector 48 through the glass tube envelope 37 to the conductive coating 38. Similarly, a variable high voltage supply 21, used to change the potential of the electrode 40 and hence the displayed color, is connected through metallic connector 49 through the glass envelope 37 to the conductive coating 39. The conductive coating 39 is connected to the aluminization layer 40 so that the aluminization layer 40 is at the same potential as the conductive coating 39. A multilayer phosphor coating 41 is placed between the aluminization layer 40 and the front of the screen. The electron beam 46 easily penetrates the thin aluminization layer 40 and strikes the phosphor layer 41 with a velocity determined by the voltage of variable high voltage supply 21. Light, which is emitted from the phosphor layer 41 when excited by the electron beam 56, is reflected from the aluminization layer 40 toward the front of the screen thereby increasing the available light output of the tube.

Figure 2:
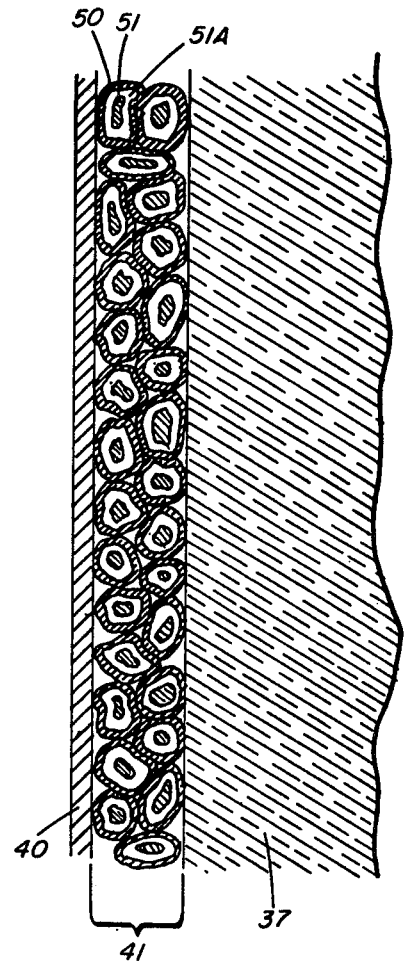
FIG. 2 is a cross-sectional view of the screen of one type of a cathode-ray tube.

Referring now to FIG. 2, there is shown a cross-sectional view of the screen 62 of the cathode-ray tube of FIG. 1. The phosphor layer 41 consists of multilayered phosphor particles in which the different layers are each a different type of phosphor. For example, the inner layer 51 of one such particle is surrounded by an outer layer 50 of another type phosphor with an inert layer 51A separating the two. The inert layer 51A absorbs electron energy without absorbing light thereby increasing the voltage difference necessary to change colors. Improved color resolution is thereby attained since the electron beam contains typically a range of electron velocity rather than a single velocity. The inner layer 51 may, for example, be a green light emitting phosphor while the outer layer 50 is a red light emitting phosphor. When the electron beam 56 penetrates through the aluminization layer 40 and strikes the phosphor layer 41 with a comparatively low velocity, the beam will only penetrate the first layer 50 of the phosphor and will not reach the inner layer 51 as the energy of the electrons is substantially completely absorbed in penetrating and exciting the first layer 50. As the electron beam velocity is increased and the electrons acquire higher momentum, the beam will penetrate deeper inside the phosphor particles and eventually penetrate through inert layer 51A into the inner layer 51. If the inner phosphor layer 51 has a higher light emitting efficiency than the outer layer 50, the light emitted from the inner layer 51 will be the predominant light output from the phosphor layer 41 at the comparatively higher beam velocities. Alternatively, one type of phosphor particle may be surrounded by an inert layer while the other is not. Also, phosphors of varying persistence may be used.

Figure 3:
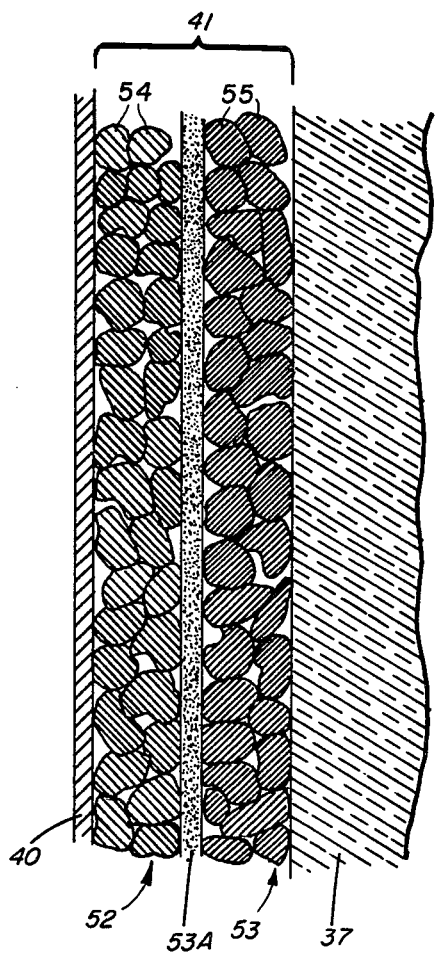
FIG. 3 is a cross-sectional view of the screen of a second type of cathode-ray tube.

Referring now to FIG. 3, there is shown an alternative method of constructing a multiple layer beam penetration type screen. Here, the phosphor layer 41 contains phosphor particles, each with light emitting layers 52 and 53, each of a different type of phosphor, separated by inert layer 53A. For example, the first layer 52 may be a phosphor which emits predominantly red light while the layer 53 is composed of phosphor particles 55 which emit predominantly green light. At comparatively low beam velocities, the beam will penetrate only into the first layer 52 and not through the second layer 53. The layer 53, when its phosphor particles are not excited, and inert layer 53A are relatively transparent to the light emitted from the first layer 52. As the beam velocity increases, electrons will penetrate through layer 52 and into the layer 53. If the phosphor particles 55 of layer 53 are of a higher efficiency phosphor than the particles 54 of layer 52, the total light emitted from the tube will be predominantly the color emitted from the second layer 53 at the higher electron beam velocity. Inert layer 53A serves the same purpose as layer 51A in FIG. 2.

In either embodiment shown in FIG. 2 or FIG. 3 more than two layers of phosphor may be used. For example, a third level of phosphor could be added between layers 51 and 50 in FIG. 2 or a third layer of phosphor particles inserted either between or on one side of phosphor layers 52 and 53 in FIG. 3 along with appropriate inert layers. Furthermore, one layer such as the layer 41 in FIG. 2 could be used in place of one of the layers 52 or 53 in FIG. 3 thereby forming a three-color tube. If the layer 41 in FIG. 2 were substituted for layer 53 in FIG. 3, at low electron beam velocity only the particles 54 in layer 52 would be excited. As the beam velocity increased to intermediate values, the outer layer 50 would be excited and at the higher electron beam velocities the inner layer of phosphor 51 would finally be excited.

Referring again to FIG. 1, the cathode-ray tube 47 will be described in its use in a random access radar display system in accordance with the present invention. Radar target returns received by radar antenna 80 and amplified and demodulated by radar transmitter/receiver 81 are converted to digital form by digitizer 82. The digitized radar signals are coupled to central computer 83 where they are converted along with data on lines 85 from peripheral units by pre-programmed instructions to the proper format for visual presentation. The data on lines 85 may include operator instructions such as desired radar range as well as ancillary data such as weather maps or target identification symbols. The central computer 83 may be capable of supplying data to several display units 16 such as shown within the dotted lines of FIG. 1. Data is coupled from the central computer 83 to the display controller 10 of the display unit 16 on lines 57. The display controller includes a refresh memory for maintaining the visual presentation of data in a flicker-free condition. Use of a refresh memory within display controller 10 frees the central computer 83 from having to perform the refresh function. The display controller 10 also provides data coupling and control signals to vector generator 11, character generator 12 and color control circuit 15. In order to cause the system to write a line, such as part of a weather map or radar target, the display controller 10 on lines 58 sends to the vector generator 11 the start and end point coordinates of the line which is to be written. The vector generator 11 converts this beginning and end point information to time varying X and Y position signals representing points on the line to be traced out. These position signals are connected out of the vector generator on lines 25 and 26 respectively. The output on line 27 includes information as to when the cathode-ray tube beam 56 is to be blanked and unblanked and at what level of brightness the line is to be written.

The display controller 10 generates signals on lines 60 to the color control circuit 15 which determine which color should be used in writing the displayed lines or characters. The color control circuit 15 on line 43 signals the variable high voltage supply 21 indicating the proper voltage to apply to the screen electrode for the desired beam penetration and hence the proper color. Also, the color control circuit 15 indicates the proper amplifier gain on line 42 for the X axis amplifier 17 and the Y axis amplifier 19 for the deflection sensitivity determined by the high voltage settings. It should be noted, however, that the deflection sensitivity changes with a tube such as illustrated in FIG. 1 is significantly less than the deflection sensitivity changes if the screen electrode and conductive coating were at the same voltage and were changed at the same time to change the color. The color control circuit 15 indicates the selected color on line 63 to video amplifier 14 for brightness adjustments among the various colors.

Similarly, on lines 59 the display controller 10 transfers data to the character generator 12 concerning the characters to be written. The position on the face of the cathode-ray tube may either be set through the character generator 12 or through the vector generator 11. The character generator 12 receives character code inputs on lines 59 from computer controller 10. The character generator 12 converts the codes to time varying X and Y deflection signals on lines 28 and 29 respectively, thereby causing the beam to trace out the desired character pattern. The character generator 12 also produces a video signal on line 30 which causes the video amplifier 14 to blank and unblank the beam 56 and to select the appropriate brightness by varying the applied voltage on line 34 and hence the beam current flowing from the cathode 33 of the electron gun 61.

Switches 22, 23 and 24 select either the vector generator 11 or character generator 12 as inputs to the X and Y axis amplifiers on lines 65 and 66 through pattern correction circuit 13 and on line 67 to video amplifier 14. The switch position is chosen through the computer controller 10 through lines not shown in the drawing. Switches 22, 23 and 24 are preferably high speed electronic switches.

The pattern correction circuit 13 receives X and Y inputs on lines 65 and 66 respectively and applies a correction factor to these signals prior to final amplification to correct for the fact that the surface of the screen of the cathode-ray tube 47 is more nearly flat than spherical. If this correction were not made the pattern on the face of the cathode-ray tube would be severely distorted. For example, if a square box were to be drawn, the sides of the box would appear curved inward. This is the "pincushion" correction referred to above.

The electron beam 56 is focussed by the voltage applied to focussing electrodes 36 by focus control 44 on line 45. Since the electrostatic lens formed between conductive coatings 38 and 39 is extremely weak in the area near the electron gun 61, the beam focus is unaffected by changes in color. Hence, the focus control 44 need not be coupled to color control circuit 15.

The X axis amplifier 17 and Y axis amplifier 19 receive their corrected inputs on lines 31 and 32 respectively. These amplifiers provide the correct signal levels for beam deflection to the deflection yoke 18 which contains both X and Y deflection coils. As mentioned previously, the gain of the X axis amplifier 17 and Y axis amplifier 19 are properly set for the chosen color by the color control circuit 15 on line 42.

FIG. 4 shows an alternative method of constructing a display system in accordance with the present invention. In the system of FIG. 4, the cathode-ray tube shown generally at 105 has two main areas of difference from the cathode-ray tube in FIG. 1. First, the two regions of conductive coating 38 and 39 in FIG. 1 are here replaced by a front section of conductive coating 75 connected to a helical strip of conductive coating 74 on the inside of the tube envelope 109. A variable high voltage power supply 21, as in FIG. 1, is connected to the front section of conductive coating 75 and the fixed high voltage power supply 20 is connected to the end of the helical strip of conductive coating 74 nearest the electron gun shown generally at 61. The second main difference with the cathode-ray tube 105 is that deflection of the electron beam 56 is accomplished by electrostatic deflection plates 72 and 73 rather than with a magnetic deflection yoke as used in the system of FIG. 1. The electron gun 61 and the screen 62 are the same as shown in FIG. 1. It is to be understood, of course, that the helical strip may be used with magnetic deflection as can the two separate regions of conductive coating be used with electrostatic deflection.

The cathode-ray tube 105 is shown used in a swept raster display system. Remotely transmitted signals are intercepted by antenna 93 and coupled to receiver 92. In some embodiments, signals may be coupled from a radar receiver and processor or other signal source through a cable thus eliminating the need for a receiver. The receiver 92 generates combined X and Y axis sync signals on line 102, demodulated video information on line 106, and color information on line 108. The video amplifier 89 amplifies the video signal to the proper voltage level and couples it to the cathode of the cathode-ray tube 105 on line 107. The sync circuit 91 separates the combined sync signal on line 102 and generates separate X and Y axis sync signals on lines 101 and 100 respectively.

When the raster is being generated in the usual fashion with the scanned lines parallel to the X axis, there is one sync pulse for the Y axis for a number of sync pulses for the X axis equal in number to the number of scanned lines in the presentation. The Y sync pulse starts the generation of the Y axis ramp in Y ramp generator 88 on line 99 while the X sync pulse starts the generation of the X axis ramp in X ramp generator 90 on line 98. Lines 103 and 104 coupling the output ramp signals between the two ramp generators are necessary for corrections to the ramp waveforms dictated by the fact mentioned previously that in the preferred embodiment the face of the cathode-ray tube is more nearly flat than round. The outputs of the X axis amplifier 87 on lines 94 and 95, which are preferably equal in magnitude but opposite in polarity, are coupled to the X deflection plates 73 while the outputs of the Y axis amplifier 86, similarly equal in magnitude but opposite in polarity, are coupled to the Y deflection plates 72.

The color control circuit 15 receives information pertaining to the color to be displayed on line 108 from receiver 92. Its operation is the same as that for the color control circuit of FIG. 1.

Although preferred embodiments of the invention have been described, numerous modifications and alterations would be apparent to one skilled in the art without departing from the spirit and scope of the present invention. For example, the circuit of FIG. 4 may be used with the cathode-ray tube of FIG. 1 and vice versa. Numerous arrangements of layered phosphors may also be used. A radial scanning mode as used in a plan position indicator color display presentation is also well within the scope of the invention. Furthermore, many different arrangements may be used for the electrodes formed from the conductive coating on the inside of the tube envelope. Materials other than glass may be used for this envelope. Although electrostatic focussing means has been described in conjunction with the preferred embodiments, magnetic focussing employing a standard focussing coil may be used as well.

What is claimed is:

1. A cathode-ray tube comprising in combination:
    an envelope, said envelope having a neck portion, an accelerating portion, said screen portion comprising beam penetration phosphor layers and a screen portion;
    an electron gun for producing a beam of electrons, said electron gun being located in said neck portion and said beam of electrons being directed toward said screen portion;
    a phosphor screen layer, said phosphor screen layer being disposed upon said screen portion of said envelope, the color of light emitted from said screen being dependent upon the velocity of electrons striking said screen layer;
    a conductive layer, said conductive layer being contiguous to said phosphor screen layer;
    a first accelerating electrode, said first accelerating electrode being disposed upon a first section of said accelerating portion of said envelope adjacent said neck portion and outside the region traversed by said beam; and a second accelerating electrode, said second accelerating electrode being disposed upon a second section of said accelerating portion of said envelope adjacent said screen portion and coupled to said conductive layer, there being a gap between said first and second accelerating electrodes upon said accelerating portion of said envelope, the color of light emitted from said phosphor screen layer being determined by a voltage applied to said second accelerating electrode, the width of said gap being less than the distance from said electron beam at the nearest approach of said electron beam to said gap and being sufficiently great that substantially no pattern distortion is effected upon changing the magnitude of a voltage applied to said second accelerating electrode.

2. The combination of claim 1 wherein said phosphor screen layer comprises a plurality of concentric layers of phosphors.

3. The combination of claim 1 wherein said phosphor screen layer comprises particles of a plurality of phosphor types, particles of at least one of said phosphor types being surrounded by an inert layer.

4. The combination of claim 1 wherein said phosphor screen layer comprises a plurality of layers of phosphor particles.

5. The combination of claim 1 wherein said phosphor screen layer comprises phosphors of differing persistence.

6. The combination of claim 1 further comprising:
a layer of aluminum disposed upon said phosphor screen layer.

* * * * *